United States Patent [19]
Walker, Jr.

[11] Patent Number: 5,097,925
[45] Date of Patent: Mar. 24, 1992

[54] TREE WALKER

[75] Inventor: George T. Walker, Jr., 303 Sequoyah Dr., Dothan, Ala. 36303

[73] Assignee: George T. Walker, Jr., Dothan, Ala.

[21] Appl. No.: 537,636

[22] Filed: Jun. 14, 1990

[51] Int. Cl.$^5$ ...................... A01M 31/02; A63B 27/00
[52] U.S. Cl. .................................... 182/135; 182/187
[58] Field of Search ............... 182/187, 188, 134, 135; 108/152

[56] References Cited

U.S. PATENT DOCUMENTS

| | | | |
|---|---|---|---|
| 3,961,686 | 6/1976 | Starkey | 182/187 |
| 4,144,616 | 3/1979 | Gould | 248/56 |
| 4,411,335 | 10/1983 | Forrester | 182/187 |
| 4,596,309 | 6/1986 | Venson | 182/187 |
| 4,674,597 | 6/1987 | Humphrey | 248/231 |
| 4,890,694 | 1/1990 | Williams | 182/135 |
| 4,953,662 | 9/1990 | Porter | 182/182 |

FOREIGN PATENT DOCUMENTS 809611 7/1951 Fed. Rep. of Germany ...... 182/187

*Primary Examiner*—Reinaldo P. Machado

[57] ABSTRACT

A lightweight, portable, tree-climbing device to provide a stable, elevated, horizontal, platfrom utilizing two separate elements for a hunter or observer. The uppermost element accommodates the user in a sitting position while the lower element accommodates his feet. The user faces the tree during the ascending and descending processes but has the option of facing the tree or leaning his back against the tree during his hunting or observing activity. Each element has tubular supporting members, which, along the the ends of the supporting cables, have predrilled holes, thus allowing for the selective adjustment of each element during initial attachment. The device further provides for selective adjustment of the support cables as the user ascends and descends the tree. The device further allows the user to climb past limbs without first having to cut them from the tree.

11 Claims, 3 Drawing Sheets

TREE WALKER

BACKGROUND

1. Field of the Invention

Portable tree platforms, tree climbing devices, and portable seats:
Class 43, Subclass 1
Class 108, Subclasses 96, 151-153
Class 182, Subclasses 20, 46, 61-63, 92, 100, 116, 120-122, 129, 133-136, 187-189, 221, 222
Class 248, Subclasses 49, 58, 65, 218.4, 219.1-219.4, 356.

2. Description of Prior Art

There are presently a wide variety of clambing devices for trees and poles which are commercially available. All of these devices are attached and/or supported about the tree or pole by means of straps, rods, bars, or a combination thereof. All of these devices have a number of disadvantages. Much of the prior art causes considerable damage to the tree to which they are attached due to the use of sharp blades or bark penetrating spikes affixed to the tree engaging edges. Another major disadvantage is the required manipulation of nuts, bolts, and/or knobs necessary to attach and remove these devices. Such manipulations are consistantly difficult, time consuming, and noisy. The major disadvantage is the inability of the prior art to easily adjust for tree taper as the user ascends and descends the tree or pole. This lack of adjustment causes vertical slippage of the tree engaging edges and causes these devices to tilt downward in a very unsafe manner. Another major disadvantage is that when using the prior art one must either climb a tree that has no limbs to the desired elevation or cut limbs out of the way. A further disadvantage is the lack of horizontal stability displayed by the prior art. The present invention provides a greatly improved tree climbing device which eleminates the previously mentioned disadvantages.

SUMMARY

It is the primary objective of the present invention to provide a greatly improved and simplified tree climbing device for use by hunters and wildlife observers. This is accomplished by a device that eleminates the use of straps, bars, and/or rods or any combination therefore as a means of support about the tree. The present invention further eliminates the necessary manipulation of nuts, bolts, and/or knobs required to attach and remove the prior art to and from the tree. It is a further object of the present invention to eliminate the use of sharp blades or bark penetrating spikes affixed to the tree engaging edges of the prior art. A further objective of the present invention is to eliminate the vertical slippage of the tree engaging edges of the prior art which is caused by the failure of said art to allow the support machanisms to adjust for tree taper as the user ascends and descends the tree. The present invention further allows for ascending and descending trees without having to cut off the limbs in order to attain the desired elevation. The final objective of the present invention is to provide a horizontally stable, elevated platform from which to hunt or observe wildlife. The manner of the implementation of the stated objectives will become apparent upon review of the supplied drawings and by reading the following detailed description.

DESCRIPTION OF THE PREFERRED EMBODIMENT

Figure 1:
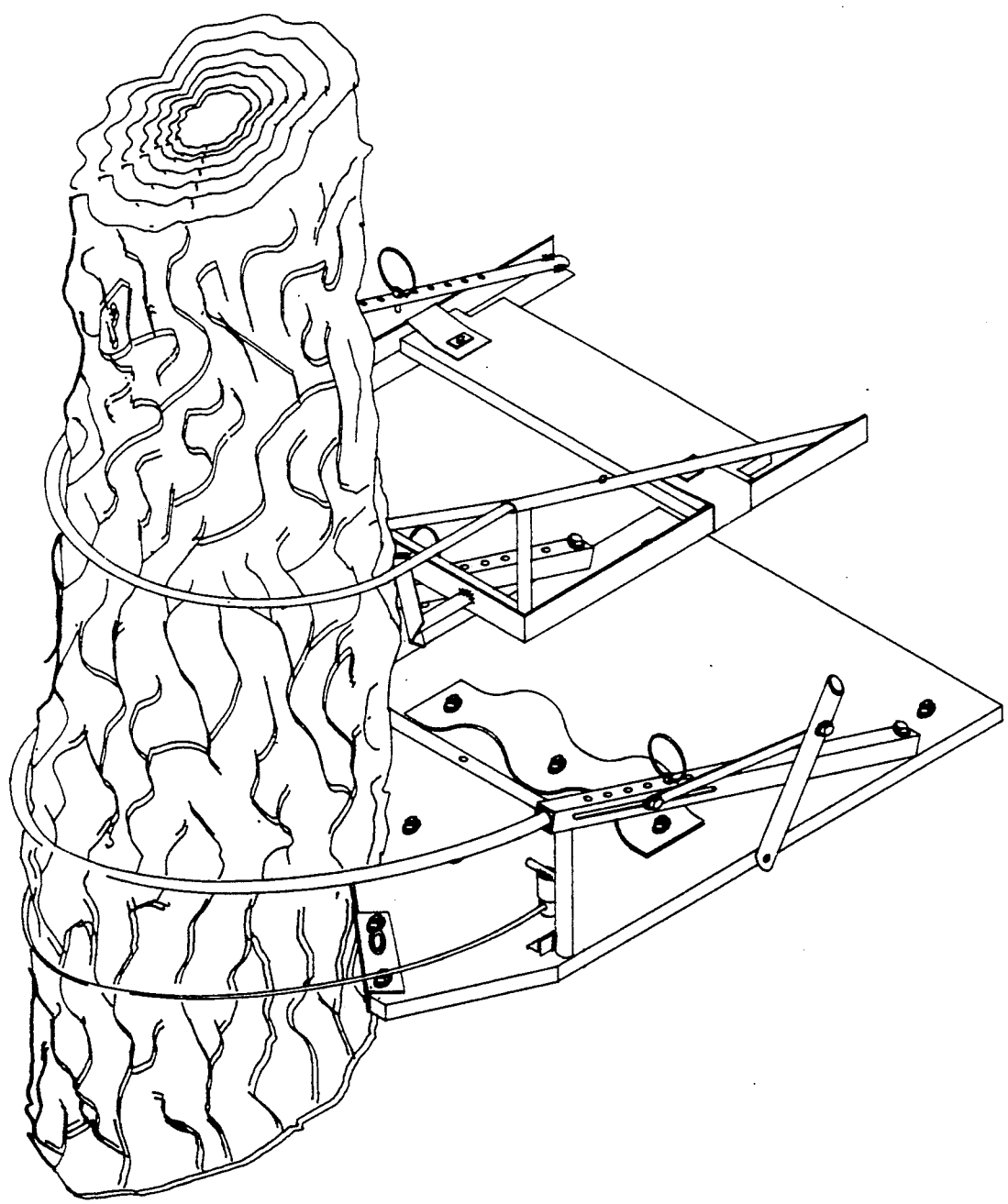
FIG. 1 is an isometric of the platforms attached to a tree.
Figure 2:
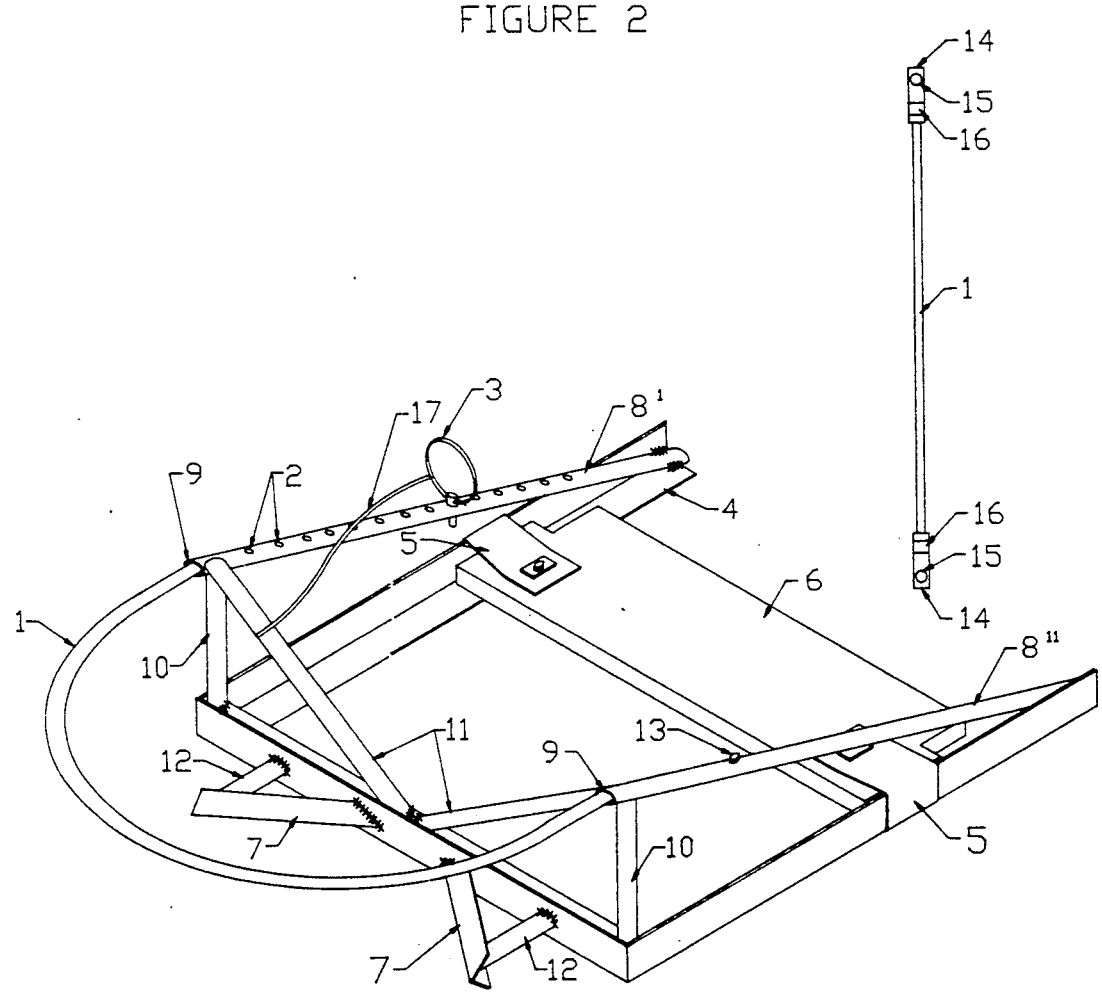
FIG. 2 is an isometric of the seat platform.
Figure 3:
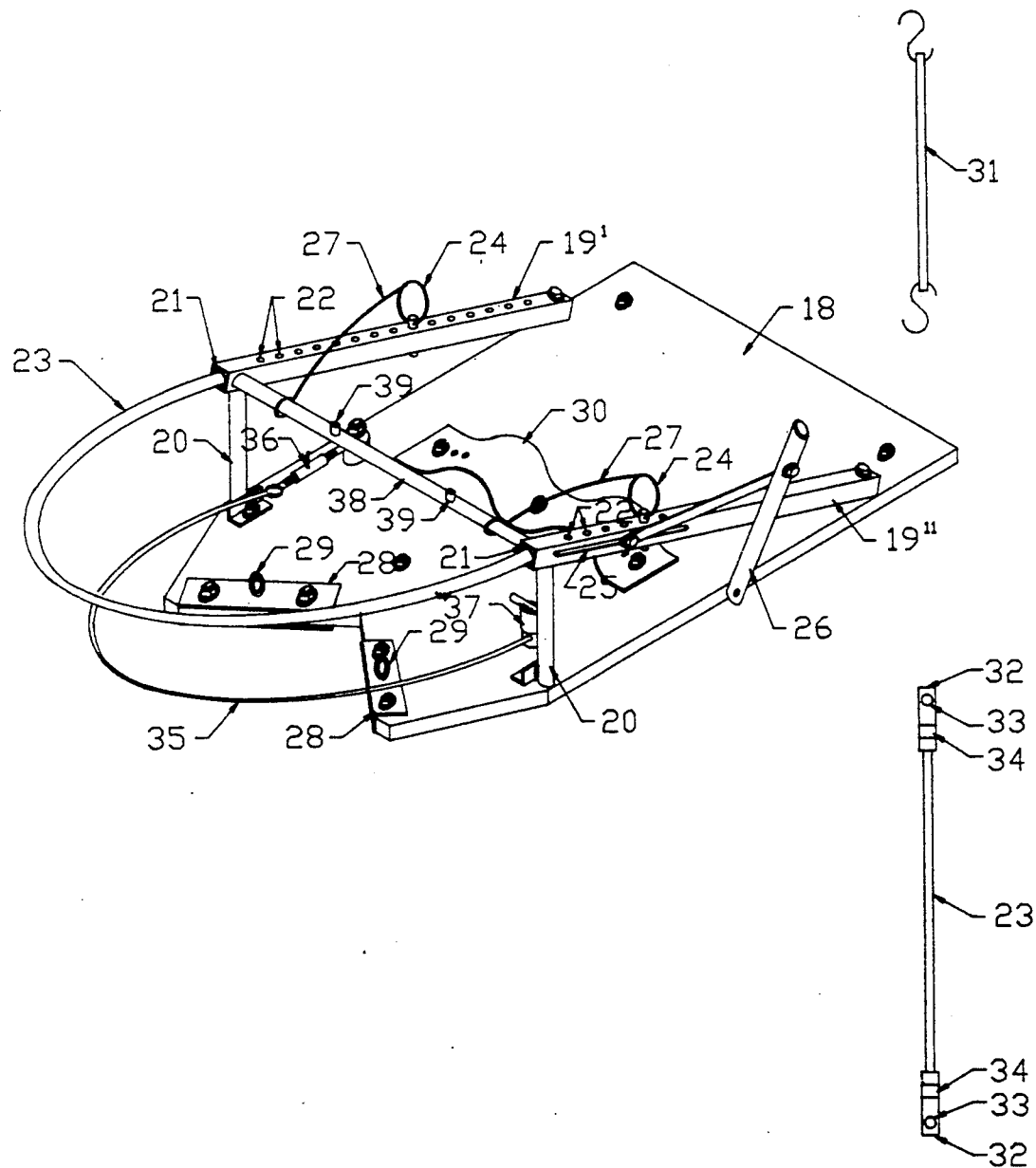
FIG. 3 is an isometric of the base platform.

As shown in FIGS. 1, 2, and 3 the present invention relates to a tree climbing device comprising an upper element (FIG. 2) and a lower element (FIG. 3).

As shown in FIG. 2, the upper element frame (4) is composed of angle material in the shape of a rectangle with one open end. One end of each support arm (8') (8") is attached to the frame (4) on the inside of the open end. The other end of each support arm (8') (8") is attached respectively to a vertical support (10), each of which is also attached to the inside corner of the closed end of the frame (4). Additional supports (11) are attached to the support arms (8') (8") at the junction of the vertical supports (10) and extend to the center of the closed end of the frame (4) where they are also attached. The tree engaging edges (7) are composed of inverted angle material with one end of each piece attached to the outside of the closed end of the frame (4) with the opposite end of each piece (7) being attached to support pieces (12) which are also attached to the outside of the closed end of the frame (4). The seat (6) is held to the inside of the frame (4) by straps (5) that encircle the sides of the frame (4), thus making it possible to slide the seat (6) toward the closed or the open end of the frame (4). The support arms (8') (8") are tubular and fitted with non-metalic inserts (9). One support arm (8') has 14 vertical holes (2) which when used with the support cable (1) and lock pin (3) allows for selective adjustment of the support cable (1). One support arm (8") has one vertical hole (13) which allows for the permanent attachment of the support cable (1) to the support arm (8"). The support cable (1) has affixed to each end a short cylinder (14) which has a vertical hole (15) through it. Each cylinder (14) is affixed with an alignment indicator (16). The lock pin (3) is attached to the support (11) by a flexible cord (17).

As shown in FIG. 3, the lower element support arms (19') (19") are attached to the platform (18) by one end while the opposite end of each is attached to a vertical support (20), the other end of which is attached to the platform (18). The vertically supported ends of the support arms (19') (19") are braced by a horizontal support (38). The support arms (19') (19") are tubular and fitted with non-metalic inserts (21). One support arm (19') has 15 vertical holes (22) which when used with the support cable (23) and the lock pin (24) allows for selective adjustment of the support cable (23). One support arm (19") has 6 vertical holes (22) which when used with the support cable (23), lock pin (24), slot (25), and adjustment lever (26) allows for selective adjustment of the support cable (23) as the user ascends and descends the tree. The support cable (23) has affixed to each end a short cylinder (32) which has a vertical hole (33) through it. Each cylinder is also supplied with an alignment indicator (34). The lock pins (24) are attached to the horizontal support (21) by flexible cords (27). When the lock pins (24) are not being used to hold the support cable (23) in place, they are stored in the lock pin holders (39). The tree engaging edges (28) are composed of four rigid bars (2 top and 2 bottom) affixed to the V-shaped edge of the platform (18). One each eyebolt (29) is affixed to the center of the top of each tree engaging edge (28). An adjustable foot strap (30) is affixed to the top side of the platform (18). A self-adjusting heel strap (31) is used to hold one's feet in the foot strap (30). A stablizing cable (35) is affixed to the platform (18) with a turnbuckle (36) on one corner of the platform (18) and a cable locking device (37) on the opposite corner of the platform (18).

In use, the support cable of the lower element is selectively adjusted on the support arm by pushing the adjustment lever toward the tree engaging edge of the platform to a position where the vertical hole nearest the tree engaging edge of the platform is aligned with the vertical hole of the support cable. The lock pin is then placed through the aligned holes of the support arm and the support cable, thus locking the support cable in place. The upper and lower elements are then secured to the tree respectively by passing the free ends of the support cables around the tree and placing them into their respective support arms. Each support cable is adjusted so as to hold their respective elements in a generally horizontal position on the tree. When the desired position has been established by aligning the respective holes of the support arms with the respective holes in the support cables, the lock pins are inserted into the vertical holes of the support arms and through the vertical holes in the support cables, thus locking the cables in place. With both elements properly attached to the tree, the seat is then moved to a position farthest away from the tree. The user then faces the tree and places his/her legs between the seat and the tree and secures his/her feet in the foot straps of the lower element by attaching one end of the heel strap to one eyebolt and pulling the heel strap around his/her heels and attaching the other end of the strap to the other eyebolt. The operator then stands up while lifting the upper element with his/her hands to a comfortable vertical distance from the lower element. While seated on the upper element, the operator raises his/her knees, thus lifting the lower element and reducing the vertical distance between the upper and lower elements. This stand-up sit-down process is continued until the desired elevation is attained. During the climbing process the operator may wish to adjsut the support cables to accomodate the tree taper. To adjust the support cable of the lower element, the operator, while sitting on the upper element, need only lift the lower element with his/her legs, pull out the lock pin from the support arm to which the adjustment lever is attached, pull the adjustment lever away from the tree, thus tightening the support cable, align the holes in the support arm and the support cable and replace the lock pin in the aligned holes. To adjust the support cable of the upper element, the operator stands on the lower element, remove the lock pin from the support arm of the upper element, slides the support cable farther into the support arm, thus tightening the support cable, align the holes in the support cable and the support arm, replace the lock pin in the aligned holes of the support arm an support cable and continue climbing. The support cable and lock pin system allow the operator to climb past limbs without having to cut the limbs from the tree. This is accomplished in the same manner as adjusting the support cables except that after removing the lock pins the free end of the support cable is pulled out of the support arm, brought over the limb, put back into the support arm, aligned, and the lock pin replaced. To descend the tree, the process is simply reversed.

While a preferred embodiment of the invention has been described using specific terms, this description is for illustration only and it is to be understood that changes and variations may be made without departing from the spirit or scope of the following claims:

I claim:

1. A tree climbing device comprising two elements, a seat-climber and a base which are used cooperatively in ascending/descending trees:
   (a) said seat-climber wherein the user sits facing the tree during the time the device is being raised to a higher elevation or being moved to a lower level; said seat-climber having tubular support arms attached thereto; said tubular support arms having a self-supporting yet flexible support cable removably and adjustably secured thereto; said seat-climber having a V-shaped tree-engaging edge and
   (b) said base comprising a foot platform having tubular support arms attached thereto; said tubular support arms having a self-supporting yet flexible support cable removably and adjustably secured thereto; said base having a V-shaped tree-engaging edge whereby
   (c) the tree is ascended by drawing said base to a comfortable height while sitting on said seat-climber, then standing on said base and raising said seat-climber to a comfortable height and repeating the process until the desired elevation has been reached, then reverse the stand-up sit-down process to descend the tree.

2. A tree climbing device according to claim 1 wherein said support cables are provided with ends having predrilled holes.

3. A tree climbing device according to claim 1 wherein said support cables are provided with alignment indicators.

4. A tree climbing device according to claim 1 wherein said support cable is permanently attached to said seat-climber at one said tubular support arm while being independently and adjustably attached to the opposite said tubular support arm of said seat-climber.

5. A tree climbing device according to claim 1 wherein said support cable is permanently attached to said base at one tubular support arm while being independently and adjustably attached to the opposite said tubular support arm of said base.

6. A tree climbing device according to claim 4 wherein said cable in conjunction with said tubular support arm of said seat climber provide an adjustable means to accommodate tree taper as the user ascends/descends the tree.

7. A tree climbing device according to claim 5 wherein said support cable in conjunction with said tubular support arm of said base provide an adjustable means to accommodate tree taper as the user ascends/descends the tree.

8. A tree climbing device according to claim 4 that provides for the removal of one end of said support cable from said support arm of said seat-climber while the user ascends/descends the tree, thus providing the user a means to by-pass tree limbs while ascending/descending the tree.

9. A tree climbing device according to claim 5 that provides for the removal of one end of said support cable from said support arm of said base while the user ascends/descends the tree, thus providing the user a means to by-pass tree limbs while ascending/descending the tree.

10. A tree climbing device according to claim 1 wherein said V-shaped tree-engaging edge of said seat-climber is constructed of angle material and attached to said seat-climber so as to provide the common edge of said angle of said angle material as said tree engaging edge.

11. A tree climbing device according to claim 1 wherein each edge of said V-shaped tree-engaging edge of said base is provided with an upper and lower blade so as to provide a double bladed tree-engaging edge.

* * * * *